(12) United States Patent
Fujii et al.

(10) Patent No.: US 9,840,132 B2
(45) Date of Patent: Dec. 12, 2017

(54) VEHICLE PANEL STRUCTURE

(71) Applicant: TOYOTA JIDOSHA KABUSHIKI KAISHA, Toyota-shi (JP)

(72) Inventors: Hayato Fujii, Miyoshi (JP); Akihiko Sakakibara, Kota-cho (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/938,043

(22) Filed: Nov. 11, 2015

(65) Prior Publication Data
US 2016/0144898 A1 May 26, 2016

(30) Foreign Application Priority Data

Nov. 21, 2014 (JP) .................................. 2014-237137

(51) Int. Cl.
| B62D 25/02 | (2006.01) |
| B60J 5/04 | (2006.01) |
| B62D 25/10 | (2006.01) |

(52) U.S. Cl.
CPC ............. B60J 5/045 (2013.01); B60J 5/0425 (2013.01); B60J 5/0437 (2013.01); B62D 25/105 (2013.01)

(58) Field of Classification Search
CPC ........ B60J 5/045; B60J 5/0437; B60J 5/0425; B62D 25/105

USPC ....................................................... 296/193.1
See application file for complete search history.

(56) References Cited

U.S. PATENT DOCUMENTS 5,906,073 A * 5/1999 Hori .......................... B60J 5/107
49/394
6,814,401 B2 * 11/2004 Takada .................. E05B 85/045
292/341.18

FOREIGN PATENT DOCUMENTS

| JP | 2003-306167 | 10/2003 |
| JP | 2008-132900 A | 6/2008 |
| JP | 2009-40079 | 2/2009 |
| JP | 2012-25256 A | 2/2012 |

* cited by examiner

*Primary Examiner* — Joseph D Pape
*Assistant Examiner* — Dana Ivey
(74) *Attorney, Agent, or Firm* — Oblon, McClelland, Maier & Neustadt, L.L.P.

(57) ABSTRACT

A vehicle panel structure according to technology disclosed herein includes: a panel member employed in a vehicle; a joining member configured including an angled wall that is disposed on one plate thickness direction side of a joined-to wall of the panel member, and that is angled with respect to the joined-to wall, and a joining wall that is disposed facing the one plate thickness direction side of the joined-to wall, and that is coupled to the angled wall through a bent portion; and a spot weld that configures a join portion where the joining wall is joined to the joined-to wall, and that is set at a portion of the join portion where an extension line running along an axial direction of the angled wall intersects.

5 Claims, 7 Drawing Sheets

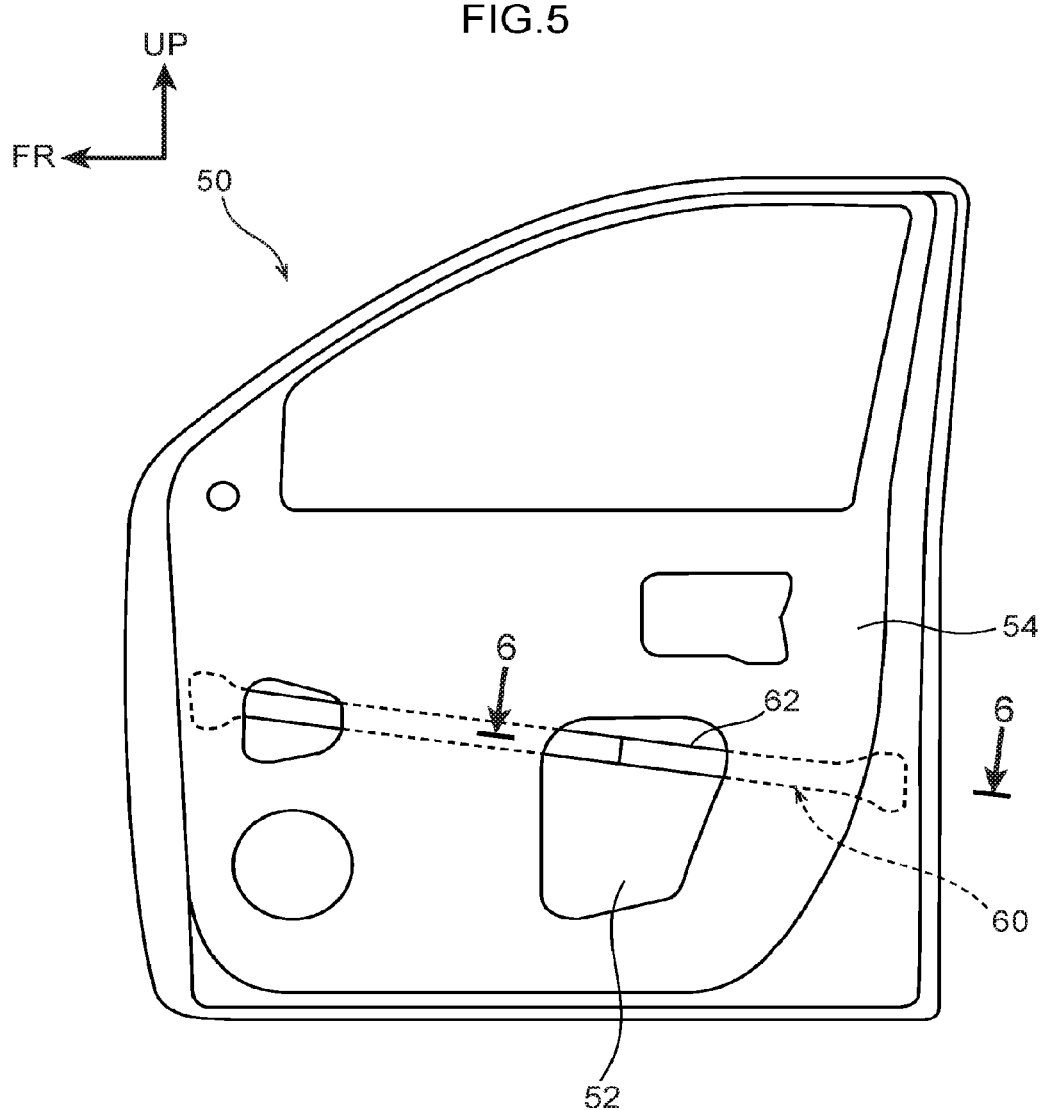

VEHICLE PANEL STRUCTURE

CROSS-REFERENCE TO RELATED APPLICATION

This application claims priority under 34 USC 119 from Japanese Patent Application No. 2014-237137 filed Nov. 21, 2014, the disclosure of which is incorporated by reference herein.

BACKGROUND

Technical Field

The present disclosure relates to a vehicle panel structure.

Related Art

Japanese Patent Application Laid-Open (JP-A) No. 2009-40079 describes a vehicle panel structure around a lower back provided at a rear end section of a vehicle. Briefly, in this structure, a lower back panel is configured including a lower back inner panel (joining member) and a lower back outer panel (panel member). Portions at both vehicle width direction ends of the lower back inner panel are bent substantially into a crank shape. Specifically, both vehicle width direction end portions of the lower back inner panel are formed with a wall portion that is bent toward the side of the lower back outer panel (referred to below as a "bent wall" for convenience), and a wall portion that extends from a leading end of the bent wall toward the vehicle width direction outer side (referred to below as a "flange" for convenience). The flange of the lower back inner panel is joined to the lower back outer panel by spot welding, and the join portion configures a weld portion (spot weld).

However, the vehicle panel structure described above has the following issue. Namely, in the vehicle panel structure described above, the weld portion is set in the vicinity of a boundary portion of the flange with the bent wall. The weld portion is therefore disposed offset in a direction normal to the plane of the lower back panel with respect to the lower back panel. Accordingly, when, for example, load input to the lower back inner panel is transmitted along the lower back inner panel toward the vehicle width direction outer side, a moment is generated by the load in the lower back inner panel about the weld portion. As a result, there is a possibility that deformation may occur at a portion peripheral to the weld portion of the lower back inner panel.

SUMMARY

An embodiment of the present invention provides a vehicle panel structure capable of suppressing a moment from being generated in a joining member about a spot weld.

A vehicle panel structure according to a first aspect of the present invention includes: a panel member employed in a vehicle; a joining member configured including an angled wall that is disposed on one plate thickness direction side of a joined-to wall of the panel member, the angled wall being angled with respect to the joined-to wall, and a joining wall that is disposed facing the one plate thickness direction side of the joined-to wall, the joining wall being coupled to the angled wall through a bent portion; and a spot weld that configures a join portion where the joining wall is joined to the joined-to wall, the spot weld being set at a portion of the join portion where an extension line running along an axial direction of the angled wall intersects.

In the vehicle panel structure according to the first aspect of the present invention, the joining wall of the joining member is disposed facing the one plate thickness direction side of the joined-to wall of the panel member employed in a vehicle. The joining wall and the joined-to wall are joined together by spot welding. The joining member includes the angled wall. The angled wall is disposed on the one plate thickness direction side of the joined-to wall, and is angled with respect to the joined-to wall. The joining wall and the angled wall are coupled together by the bent portion. The join portion where the joining wall and the joined-to wall are joined together by spot welding configures the spot weld.

The spot weld is set at the portion of the join portion where the extension line in the axial direction of the angled wall intersects. Namely, the spot weld is configured so as to not to be offset in a direction normal to the plane of the angled wall with respect to the angled wall. A moment about the spot weld is accordingly suppressed from being generated in the joining member, even when load input to the joining member is transmitted along the angled wall toward the joining wall side.

A vehicle panel structure according to a second aspect of the present invention is the first aspect of the present invention, wherein the bent portion is formed in a circular arc shape protruding toward a side of the angled wall as viewed along a plate thickness direction of the joining wall.

In the vehicle panel structure according to the second aspect of the present invention, the bent portion is formed in a circular arc shape protruding toward the side of the angled wall as viewed along the plate thickness direction of the joining wall. A bend ridge line between the bent portion and the angled wall, and a bend ridge line between the bent portion and the joining wall, can accordingly be configured with a long length. Accordingly, when load input to the joining member is transmitted along the angled wall toward the joining wall side, stress arising in the bent portion (a bend ridge line portion between the bent portion and the angled wall, and a bend ridge line portion between the bent portion and the joining wall) can be lessened.

A vehicle panel structure according to a third aspect of the present invention is the first aspect or the second aspect, wherein the panel member is configured by a dent reinforcement panel reinforcing a hood outer panel configuring a vehicle hood, and the joining member is configured by a striker reinforcement provided with a striker.

In the vehicle panel structure according to the third aspect of the present invention, the panel member is configured by the dent reinforcement panel configuring the vehicle hood. The joining member is configured by the striker reinforcement, and the striker reinforcement is provided with the striker. This thereby enables deformation of the joining wall of the striker reinforcement due to load input to the striker reinforcement from the striker when opening and closing the hood to be suppressed. This thereby enables an increase in the opening and closing durability of the hood.

A vehicle panel structure according to a fourth aspect of the present invention is the vehicle panel structure of the first aspect or the second aspect, wherein: the panel member is configured by a door inner panel configuring a vehicle door; and the joining member is configured by a dent reinforcement disposed on a vehicle width direction outer side of the door inner panel.

In the vehicle panel structure according to the fourth aspect of the present invention, the panel member is configured by the door inner panel configuring the vehicle door, and the joining member is configured by the dent reinforcement. This thereby enables deformation of the joining wall of the dent reinforcement due to load input to the dent reinforcement when opening and closing the door to be suppressed. This thereby enables an increase in the opening and closing durability of the door.

The vehicle panel structure according to the first aspect of the present invention enables a moment to be suppressed from being generated about the spot weld.

The vehicle panel structure according to the second aspect of the present invention enables stress acting on the bent portion to be lessened.

The vehicle panel structure according to the third aspect of the present invention enables the opening and closing durability of the hood to be increased.

The vehicle panel structure according to the fourth aspect of the present invention enables the opening and closing durability of the door to be increased.

BRIEF DESCRIPTION OF THE DRAWINGS

Exemplary embodiments of the present invention will be described in detail based on the following figures, wherein:

FIG. 5 is a side view illustrating a door applied with a vehicle panel structure S2 according to a second exemplary embodiment, as viewed from the vehicle width direction inner side;

DETAILED DESCRIPTION

First Exemplary Embodiment

Figure 1:
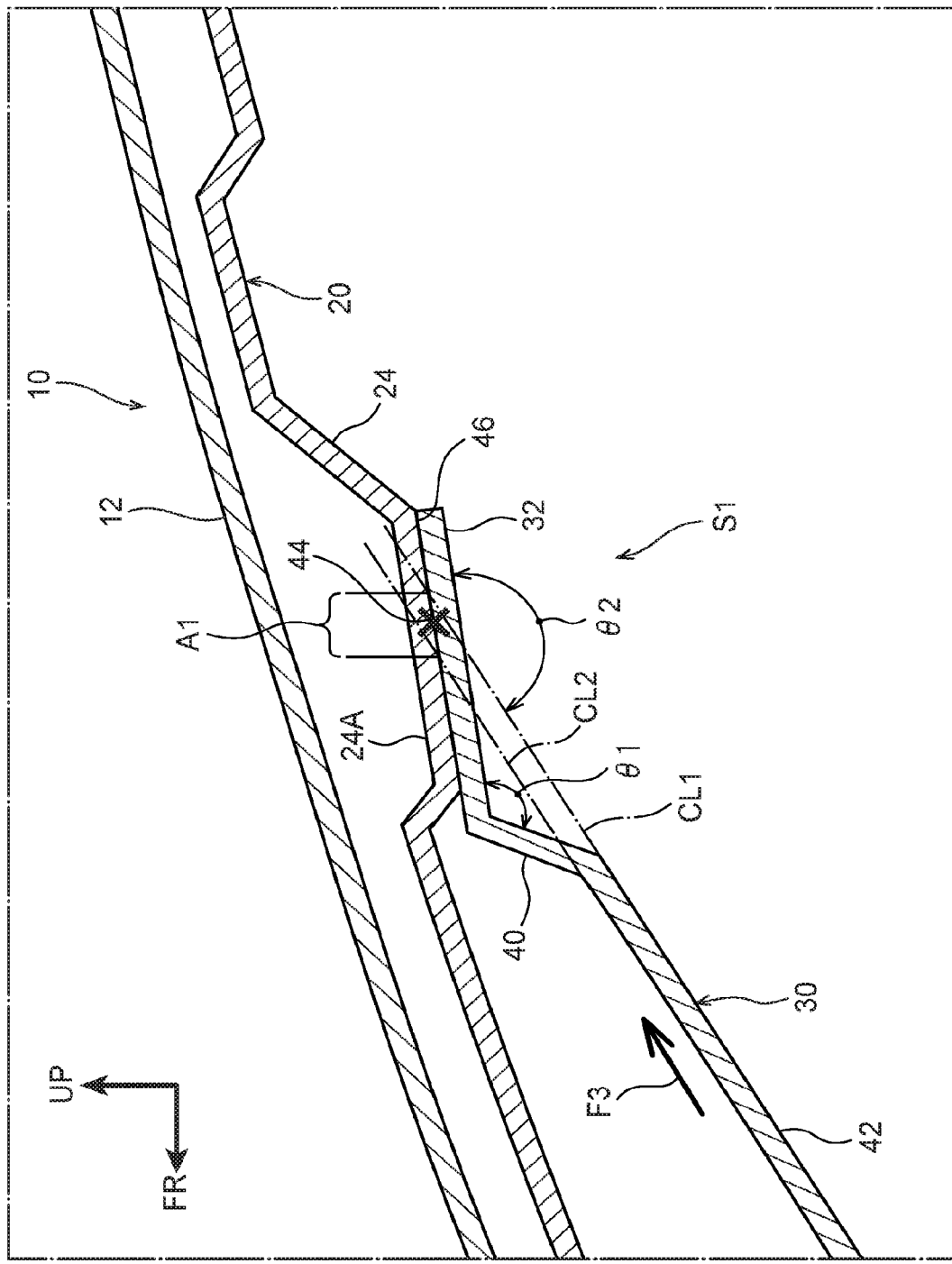
FIG. 1 is a side cross-section (an enlarged cross-section of the section A in FIG. 3) illustrating a join portion between a dent reinforcement panel and striker reinforcement of a hood applied with a vehicle panel structure S1 according to a first exemplary embodiment, as viewed from the left side of the vehicle.

Explanation follows regarding a vehicle panel structure S1 according to a first exemplary embodiment, with reference to FIG. 1 to FIG. 4. In the drawings, the arrow FR indicates the vehicle front side, the arrow UP indicates the vehicle upper side, and the arrow RH indicates the vehicle right side (one side in the vehicle width direction) of a vehicle (car) applied with the vehicle panel structure S1, as appropriate. Unless specifically indicated otherwise, in the following explanation, reference simply to front-rear, up-down, and left-right directions refers to the front and rear in the vehicle front-rear direction, up and down in the vehicle up-down direction, and the left and right of the vehicle (when facing forward).

Figure 2:
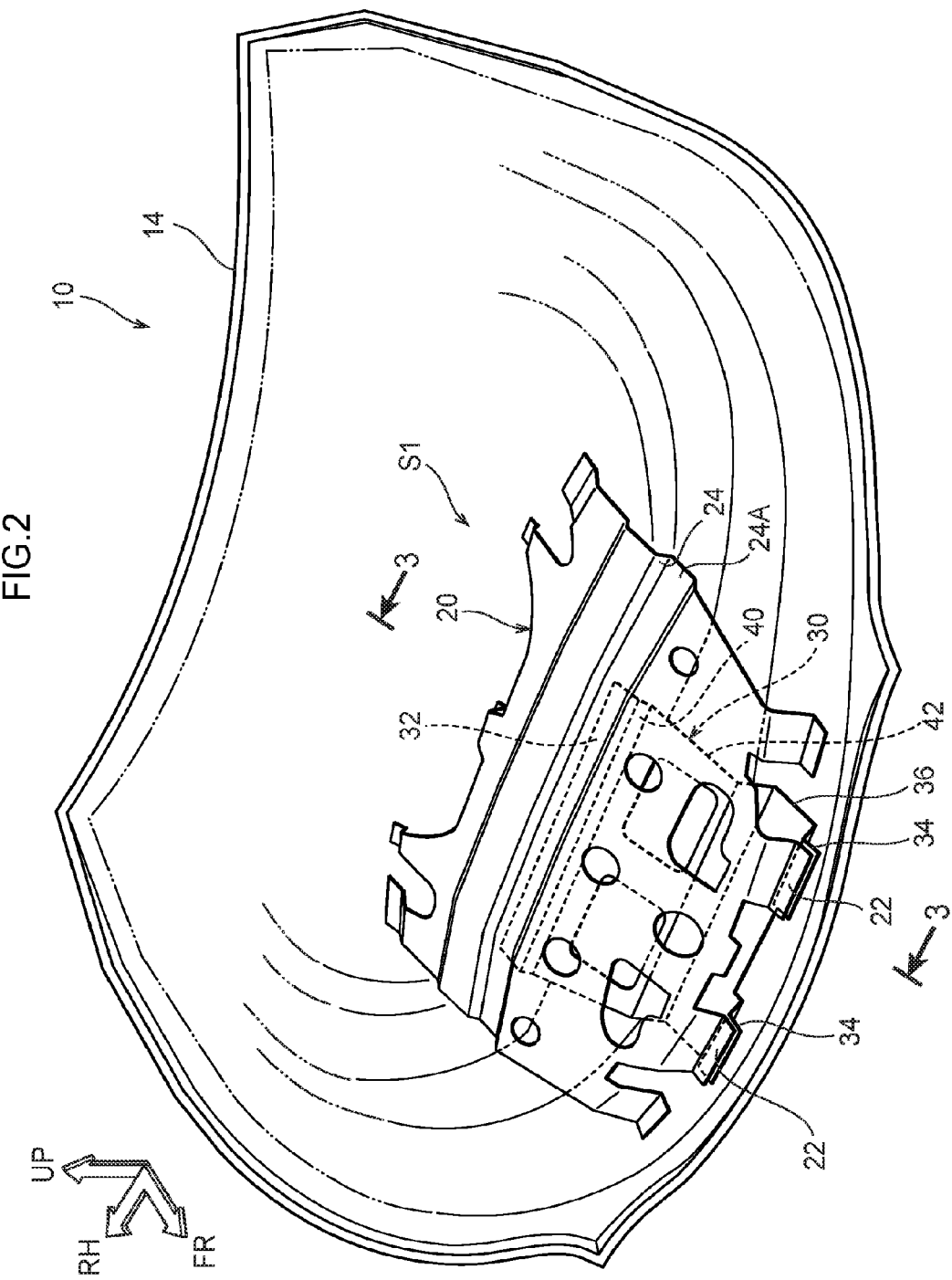
FIG. 2 is a perspective view illustrating the overall hood illustrated in FIG. 1 in a state in which a hood outer panel has been removed, as viewed from the oblique front left of the vehicle.
Figure 3:
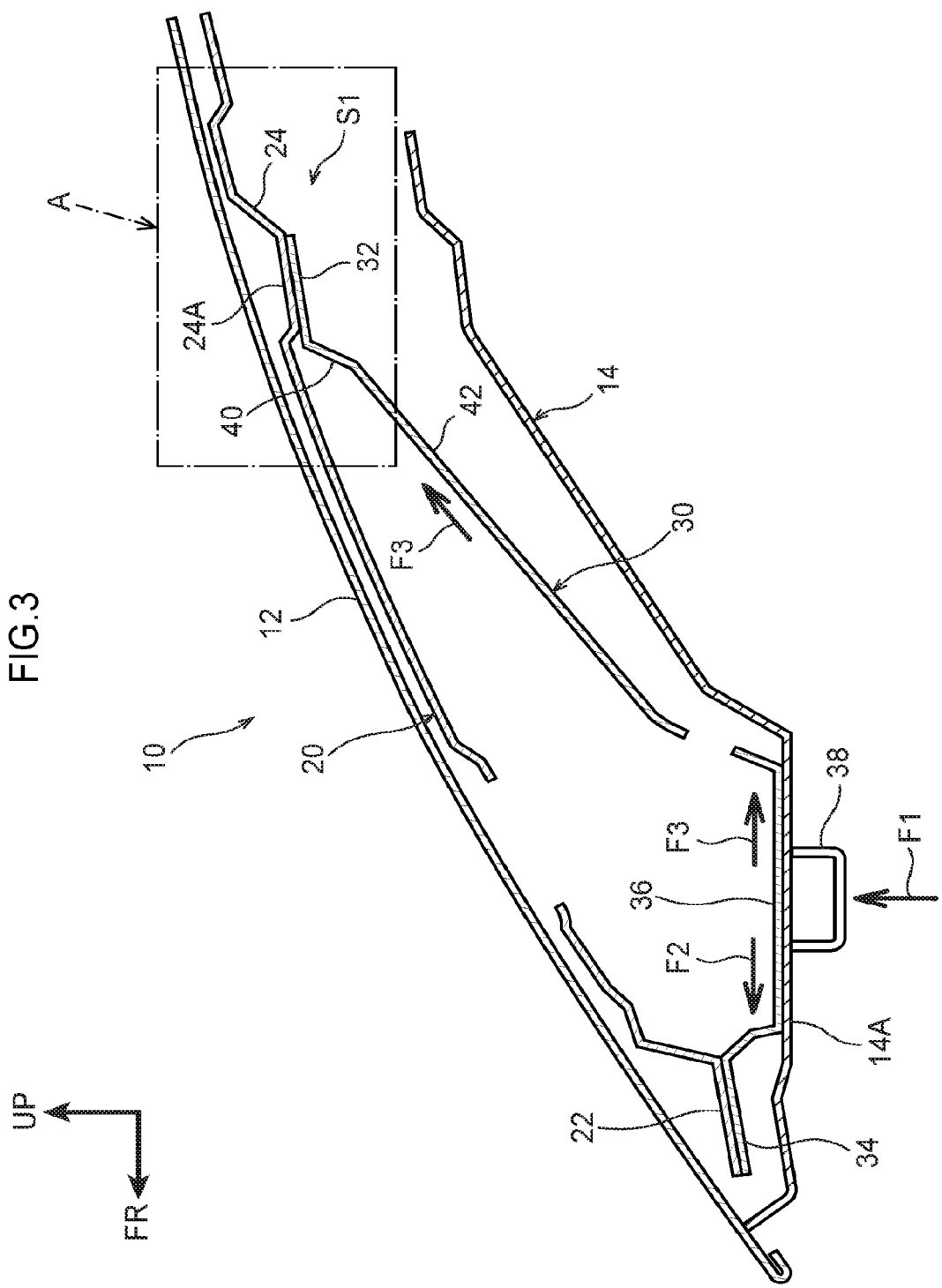
FIG. 3 is a side cross-section illustrating a front end portion of the hood illustrated in FIG. 2, as viewed from the left side of the vehicle.

FIG. 2 is a perspective view illustrating a hood 10 provided to a front section of the vehicle in a state in which a hood outer panel 12 has been removed, as viewed diagonally from the front left. FIG. 3 is a cross-section of a front end portion of the hood 10, as viewed from the left side. As shown in these drawings, in the first exemplary embodiment, the vehicle panel structure S1 is applied to the hood 10. Explanation follows regarding configuration of the hood 10.

As illustrated in FIG. 3, the hood 10 includes the hood outer panel 12 configuring a design face of the hood 10, and a hood inner panel 14 that reinforces the hood outer panel 12. In side view, the hood outer panel 12 is angled gently toward the upper side on progression toward the rear side. The hood inner panel 14 is disposed at a lower side of the hood outer panel 12, and outer peripheral edges of the hood inner panel 14 and the hood outer panel 12 are joined together by hemming or the like. A peripheral wall 14A is formed at a front end portion of the hood inner panel 14, and the peripheral wall 14A is disposed with its plate thickness direction in the up-down direction. In the hood 10, portions on both vehicle width direction sides of a rear end portion of the hood 10 are coupled to the vehicle body by hood hinges (not illustrated in the drawings), and the hood 10 is supported by the hood hinges so as to be capable of swinging about an axial direction running in the vehicle width direction. The hood 10 is thereby configured capable of opening up and closing off a vehicle engine room (power unit chamber).

As illustrated in FIG. 2, a front end side of the hood 10 is provided with a dent reinforcement panel 20, serving as a "panel member", between the hood outer panel 12 and the hood inner panel 14. The dent reinforcement panel 20 is formed in a plate shape, and is angled toward the upper side on progression toward the rear side so as to follow a lower face of the hood outer panel 12 in side view (see FIG. 3). The dent reinforcement panel 20 is joined to the hood outer panel 12, and reinforces the hood outer panel 12.

Plural joined-to flanges 22 are formed at a front end portion of the dent reinforcement panel 20 (at two locations in the present exemplary embodiment), and the joined-to flanges 22 are disposed with their plate thickness direction substantially in the up-down direction. A portion at the front end of the dent reinforcement panel 20 is bent toward the lower side and connected to rear ends of the joined-to flanges 22.

A protruding portion 24 that protrudes toward the lower side is formed at a rear end side of the dent reinforcement panel 20. The protruding portion 24 is formed substantially in a U shape opening toward the upper side as viewed in side cross-section. A bottom wall of the protruding portion 24 configures a joined-to wall 24A, and the joined-to wall 24A is disposed at a slight angle toward the upper side on progression toward the rear side, and extends along the vehicle width direction.

The hood 10 also includes striker reinforcement 30, serving as a "joining member". The striker reinforcement 30 is formed substantially in a plate shape, and is disposed between the hood inner panel 14 and the dent reinforcement panel 20 at an overall angle toward the upper side on progression toward the rear side in side view (see FIG. 3). A joining wall 32 is formed at a rear end portion of the striker reinforcement 30, and the joining wall 32 is disposed at the lower side of the joined-to wall 24A of the dent reinforcement panel 20, facing the joined-to wall 24A along the plate thickness direction of the joined-to wall 24A. The joining wall 32 and the joined-to wall 24A are joined together by spot welding in a superimposed state of the joining wall 32 and joined-to wall 24A. Note that explanation regarding welding positions of the joining wall 32 and the joined-to wall 24A will be given later.

Plural joining flanges 34 are formed at a front end portion of the striker reinforcement 30 (at two locations in the present exemplary embodiment). The joining flanges 34 are disposed at the lower side of the joined-to flanges 22, facing the joined-to flanges 22 along the plate thickness direction of the joined-to flanges 22. The joining flanges 34 and the joined-to flanges 22 are joined together by spot welding in a superimposed state of the joining flanges 34 and the joined-to flanges 22.

At a front end side of the striker reinforcement 30, a striker fixing wall 36 is formed at a rear side of the joining flanges 34. The striker fixing wall 36 is disposed at the upper side of the peripheral wall 14A of the hood inner panel 14, facing the peripheral wall 14A along the plate thickness direction of the peripheral wall 14A. A front end portion of the striker fixing wall 36 is bent toward the upper side and connected to rear ends of the joining flanges 34.

As illustrated in FIG. 3, a striker 38 is provided at a vehicle width direction central portion of the striker fixing wall 36 for fixing a front end portion of the hood 10 to the vehicle body. The striker 38 is formed in substantially in a U-shape opening toward the upper side as viewed from the side, and both length direction end portions of the striker 38 are fixed to the striker fixing wall 36. The striker 38 thus projects out from the striker fixing wall 36 toward the lower side. Note that a hole, not illustrated in the drawings, through which the striker 38 is inserted, is formed in the peripheral wall 14A of the hood inner panel 14. A lower end portion of the striker 38 engages with a hood locking device (not illustrated in the drawings) provided to the vehicle body, thereby fixing the front end portion of the hood 10 to the vehicle body.

A bent portion 40 is formed at a rear end side of the striker reinforcement 30. The bent portion 40 is bent around from a front end of the joining wall 32 toward the lower side, and is angled toward the front side on progression toward the lower side as viewed in side cross-section. The bent portion 40 extends in a straight line along the vehicle width direction as viewed along the plate thickness direction of the joining wall 32. An angle θ1 (see FIG. 1) formed between the joining wall 32 and the bent portion 40 is set as an obtuse angle.

The striker reinforcement 30 includes an angled wall 42 coupling a lower end of the bent portion 40 to a rear end of the striker fixing wall 36. The angled wall 42 is angled toward the front side on progression toward the lower side as viewed in side cross-section. The angled wall 42 is accordingly disposed further to the lower side (one side in the plate thickness direction of the joined-to wall 24A) than the joining wall 32 (joined-to wall 24A), and is angled with respect to the joining wall 32 (the joined-to wall 24A). An angle θ2 (see FIG. 1) formed between the joining wall 32 and the angled wall 42 is set as an obtuse angle, and is set larger than the angle θ1 above.

As illustrated in FIG. 1, portions where the joining wall 32 and the joined-to wall 24A are joined together by spot welding as mentioned above configure spot welds 44, and plural of the spot welds 44 are formed along the vehicle width direction. The positions of the spot welds 44 in the front-rear direction are set as follows. First, a line extending along a lower face of the angled wall 42 as viewed in side cross-section is taken as a reference line (extension line) CL1. A line extending along an upper face of the angled wall 42 as viewed in side cross-section is taken as a reference line (extension line) CL2. The joining wall 32 and the joined-to wall 24A are joined together in an area A1 that is a region of a mating face 46 between the joining wall 32 and the joined-to wall 24A between a portion where the reference line CL1 intersects and a portion where the reference line CL2 intersects. The spot welds 44 are thus set in the area A1 of the joining wall 32, and are set such that they are not offset in a direction normal to the plane of the angled wall 42 with respect to the angled wall 42 as viewed in side cross-section. The area A1 of the joining wall 32 corresponds to "a portion of the join portion where an extension line running along the axial direction of the angled wall intersects" of technology disclosed herein.

Next, explanation follows regarding operation and advantageous effects of the first exemplary embodiment, drawing comparisons with a comparative example described below.

Figure 4A:
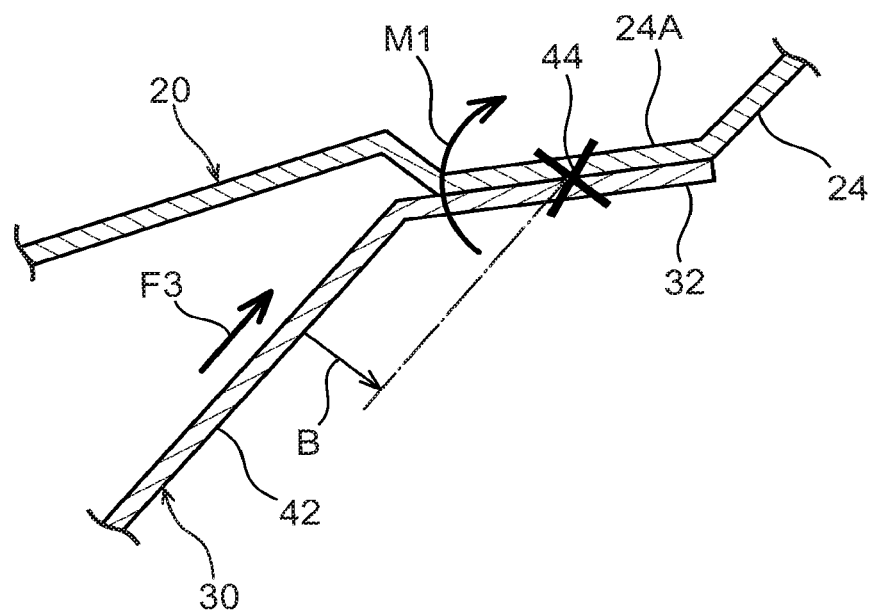
FIG. 4A is a side cross-section illustrating a join portion between a dent reinforcement panel and striker reinforcement in a hood of a comparative example.
Figure 4B:
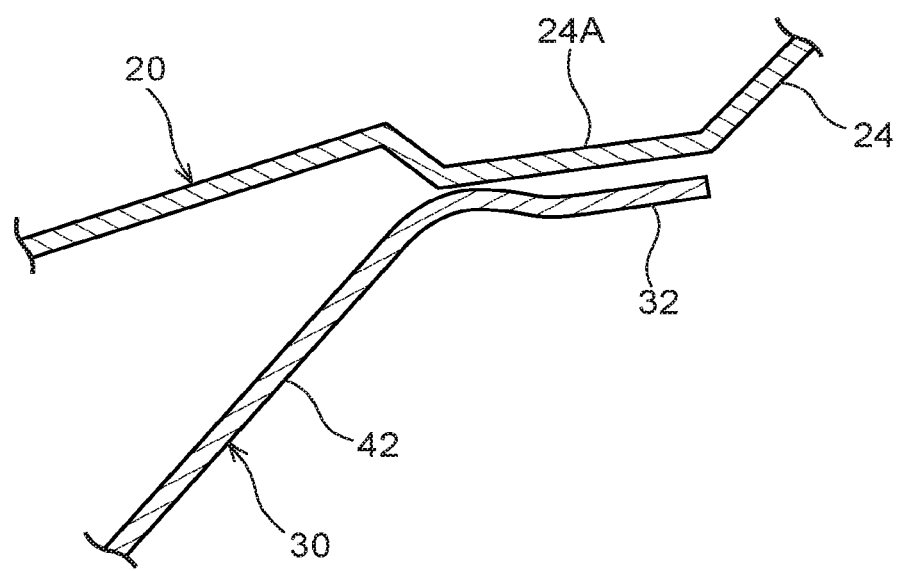
FIG. 4B is a side cross-section to explain deformation of the striker reinforcement in the hood of the comparative example.

First, explanation follows regarding configuration of a hood of a comparative example, with reference to FIG. 4A. The hood of the comparative example is of similar configuration to the hood 10 of the first exemplary embodiment, with the exception of the point described below. Note that in FIG. 4A and FIG. 4B, portions of similar configuration to in the first exemplary embodiment are allocated the same reference numerals.

Namely, in the hood of the comparative example, the bent portion 40 of the present exemplary embodiment is omitted from the rear end portion of the striker reinforcement 30. A front end of the joining wall 32 of the striker reinforcement 30 is therefore joined to a rear end of the angled wall 42. The spot welds 44 are disposed at a specific separation distance to the rear side of a boundary between the joining wall 32 and the angled wall 42. The spot welds 44 are therefore disposed offset to one side of the angled wall 42 in a direction normal to the plane of the angled wall 42 (specifically, to the arrow B direction side in FIG. 4A, this being an oblique rear lower side) as viewed in side cross-section.

Since the rear end portion of the hood 10 is supported by the hood hinges so as to be capable of swinging, when closing the engine room with the hood 10, a front end portion of the hood 10 is lowered, and the striker 38 engages with the hood locking device. When this is performed, as illustrated in FIG. 3, a load F1 toward the upper side is input to the striker 38 from the hood locking device. Since the striker 38 is fixed to the striker fixing wall 36 of the striker reinforcement 30, the load F1 is split into a load F2 transmitted along the striker fixing wall 36 toward the front side, and a load F3 transmitted along the striker fixing wall 36 toward the rear side. The load F3 is transmitted along the angled wall 42 toward the rear end side of the striker reinforcement 30.

Note that as illustrated in FIG. 4A, in the comparative example, the spot welds 44 are disposed offset to one side of the angled wall 42 in a direction normal to the plane of the angled wall 42 (on the arrow B direction side in FIG. 4A) in side cross-section, as described above. Due to the load F3, a clockwise moment M1 about the spot welds 44 acts in the striker reinforcement 30 as viewed from the left side of the vehicle. A moment load accordingly acts on the boundary portion between the joining wall 32 and the angled wall 42, and there is a possibility of deformation of the joining wall 32 occurring at this boundary portion (see FIG. 4B). In particular, since the above moment load acts on the joining wall 32 each time the hood 10 is opened or closed, there is a possibility of a reduction in the opening and closing durability of the hood 10. However, if for example the plate thickness of the striker reinforcement 30 were to be made thicker in order to increase the opening and closing durability of the hood 10, the issue of an increase in the weight of the hood 10 would arise. Note that in FIG. 4B, the joining wall 32 and the joined-to wall 24A are illustrated at a separation to each other in order to facilitate understanding of deformation of the joining wall 32.

As illustrated in FIG. 1, in the hood 10 of the first exemplary embodiment, the bent portion 40 is formed at the rear end portion of the striker reinforcement 30, and the joining wall 32 and the angled wall 42 of the striker reinforcement 30 are coupled together by the bent portion 40. Moreover, the joining wall 32 and the joined-to wall 24A are joined together in the area A1, this being a region between a portion where the reference line CL1 intersects and a portion where the reference line CL2 intersects on the mating face 46 between the joining wall 32 and the joined-to wall 24A. In other words, the spot welds 44 are set in the area A1 of the joining wall 32. The spot welds 44 are accordingly disposed such that they are not offset in a direction normal to the plane of the angled wall 42 with respect to the angled wall 42 as viewed in side cross-section.

This thereby enables the moment M1 about the spot welds 44 to be suppressed from being generated in the striker reinforcement 30 by the load F3. Accordingly, deformation of the boundary portion of the joining wall 32 can be suppressed in comparison to in the comparative example. As a result, the opening and closing durability of the hood 10 can be increased without increasing the plate thickness of the striker reinforcement 30.

Second Exemplary Embodiment

Figure 6:
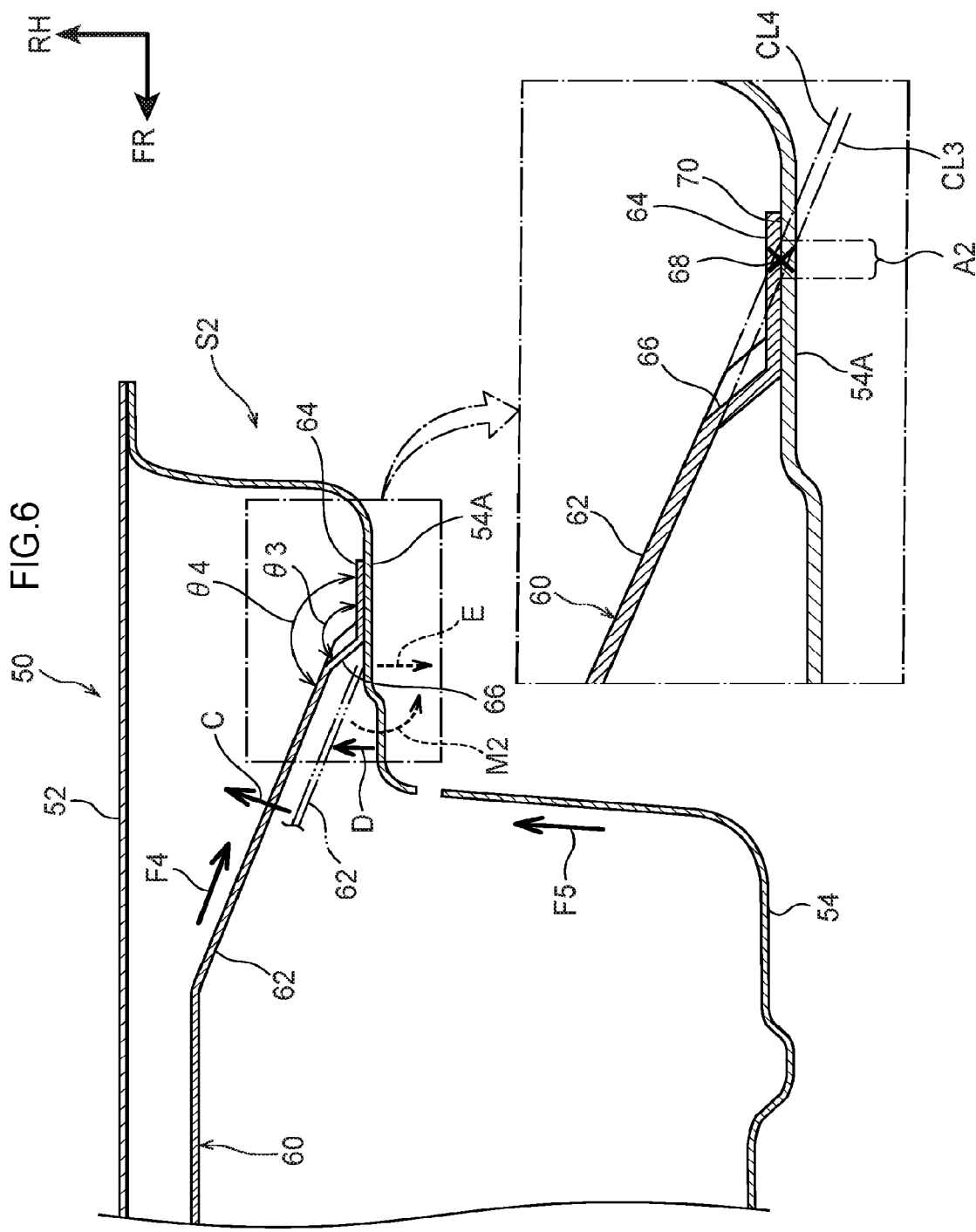
FIG. 6 is a plan view cross-section (an enlarged cross-section taken along line 6-6 in FIG. 5) illustrating a rear end portion of the door illustrated in FIG. 5.
Figure 7:
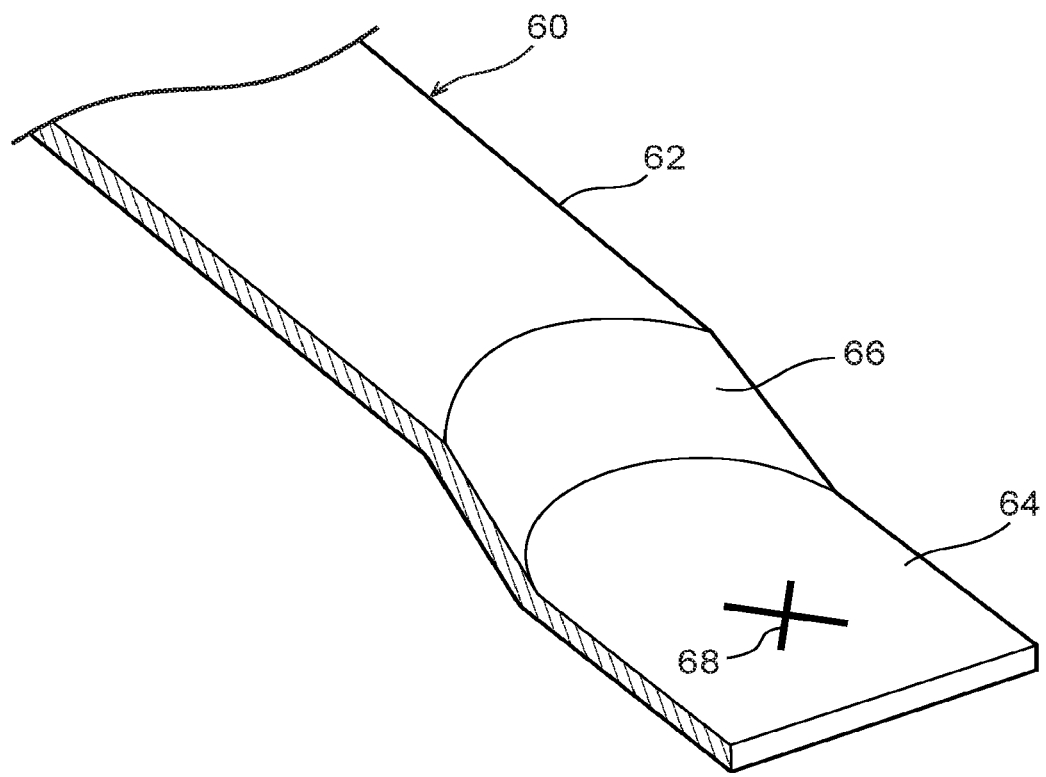
FIG. 7 is a perspective view illustrating a bent portion of dent reinforcement illustrated in FIG. 6.

Explanation follows regarding a vehicle panel structure S2 of a second exemplary embodiment, with reference to FIG. 5 to FIG. 7. The vehicle panel structure S2 of the second exemplary embodiment is applied to a side door 50, serving as a "door", installed to a side section of a vehicle (the side door 50 installed to a right side section of the vehicle is illustrated in FIG. 5 and FIG. 6).

As illustrated in FIG. 5 and FIG. 6, the side door 50 is configured including a door outer panel 52, configuring a design face of the side door 50, and a door inner panel 54, serving as a "panel member" that reinforces the door outer panel 52. As illustrated in FIG. 6, the door outer panel 52 is disposed with its plate thickness direction substantially in the vehicle width direction. The door inner panel 54 is disposed on the vehicle width direction inner side of the door outer panel 52, and is bent substantially into a recessed shape opening toward the vehicle width direction outer side in plan view cross-section. Outer peripheral edges of the door outer panel 52 and the door inner panel 54 are joined together by hemming or the like. Note that a front end portion of the side door 50 is coupled to the vehicle body by door hinges (not illustrated in the drawings), and the side door 50 is supported by the door hinges so as to be capable of swinging about an axial direction running in the up-down direction. A door opening formed to the vehicle body can accordingly be opened up and closed off by the side door 50.

A portion at the rear end of the door inner panel 54 is bent substantially into a crank shape in plan view cross-section. A vehicle width direction intermediate portion of the portion at the rear end of the door inner panel 54 configures a joined-to wall 54A. The joined-to wall 54A is disposed with its plate thickness direction substantially along the vehicle width direction.

The side door 50 further includes dent reinforcement 60, serving as a "joining member" between the door outer panel 52 and the door inner panel 54. The dent reinforcement 60 is formed in an elongated plate shape with its length direction substantially along the front-rear direction, and is disposed with its plate thickness direction substantially in the vehicle width direction (see FIG. 5). Although they are not illustrated in the drawings, the dent reinforcement 60 is formed with plural beads running along the length direction of the dent reinforcement 60, and a front end portion of the dent reinforcement 60 is fixed to a portion at the front end of the door outer panel 52.

An angled wall 62 is formed at a rear end side of the dent reinforcement 60. The angled wall 62 is angled toward the vehicle width direction inner side on progression toward the rear side in plan view cross-section, and a rear end of the angled wall 62 is disposed at the vehicle width direction outer side of the joined-to wall 54A of the door inner panel 54. The angled wall 62 is accordingly disposed on one plate thickness direction side (on the vehicle width direction outer side) of the joined-to wall 54A, and is at an angle with respect to the joined-to wall 54A.

A joining wall 64 is formed at a rear end portion of the dent reinforcement 60, and the joining wall 64 is coupled to a rear end of the angled wall 62 through a bent portion 66, described later. The joining wall 64 is disposed at the vehicle width direction outer side of the joined-to wall 54A of the door inner panel 54, facing the joined-to wall 54A along the plate thickness direction of the joined-to wall 54A. An angle θ4 formed between the joining wall 64 and the angled wall 62 is set as an obtuse angle.

The joining wall 64 and the joined-to wall 54A are joined together by spot welding in a superimposed state of the joining wall 64 and the joined-to wall 54A, with a joined portion configuring a spot weld 68. The front-rear position of the spot weld 68 is set similarly to in the first exemplary embodiment. Namely, a line extending along a vehicle width direction inner side face of the angled wall 62 in plan view cross-section is taken as a reference line (extension line) CL3. A line extending along a vehicle width direction outer side face of the angled wall 62 in plan view cross-section is taken as a reference line (extension line) CL4. The joining wall 64 and the joined-to wall 54A are joined together in an area A2 that is a region of a mating face 70 between the joining wall 64 and the joined-to wall 54A between a portion where the reference line CL3 intersects and a portion where the reference line CL4 intersects. The spot weld 68 is thus set in the area A2 of the joining wall 64, and is set at a position that is not offset in a direction normal to the plane of the angled wall 62 with respect to the angled wall 62 in plan view cross-section. The area A2 of the joining wall 64 corresponds to "a portion of the join portion where an extension line running along the axial direction of the angled wall intersects" of technology disclosed herein.

In the dent reinforcement 60, the bent portion 66 is formed coupling together the rear end of the angled wall 62 and a front end of the joining wall 64. The bent portion 66 extends out from the front end of the joining wall 64 toward the vehicle width direction outer side, and is connected to the rear end of the angled wall 62. Moreover, as illustrated in FIG. 7, the bent portion 66 is curved in a circular arc shape protruding toward the front side as viewed along the plate thickness direction of the joining wall 64. Specifically, the bent portion 66 is curved substantially in a circular arc shape centered on the spot weld 68 as viewed along the plate thickness direction of the joining wall 64. Moreover, as illustrated in FIG. 6, an angle θ3 formed between the joining wall 64 and the bent portion 66 in a plan view cross-section passing through the spot weld 68 is set as an obtuse angle, and is set smaller than the angle θ4 described above.

Next, explanation follows regarding operation and advantageous effects of the second exemplary embodiment, drawing comparisons with a comparative example described below.

First, explanation follows regarding configuration of a side door of a comparative example. The side door of the comparative example is of similar configuration to the side door 50 of the second exemplary embodiment, with the exception of the point described below. Namely, as illustrated by the double-dotted intermittent lines in FIG. 6, the bent portion 66 of the second exemplary embodiment is omitted from the rear end side of the dent reinforcement 60 in the side door of the comparative example. The front end of the joining wall 64 of the dent reinforcement 60 is accordingly connected to the rear end of the angled wall 62. Moreover, the spot weld 68 is disposed at a specific separation distance to the rear side of a boundary between the angled wall 62 and the joining wall 64. The spot weld 68 is accordingly disposed offset to one side of the angled wall 62 (to the arrow C direction side in FIG. 6, this being an oblique rear side on the vehicle width direction outer side) in a direction normal to the plane of the angled wall 62 in plan view cross-section.

Since the front end portion of the side door 50 is supported by the door hinges so as to be capable of swinging, centrifugal force acts on the dent reinforcement 60 when swinging the side door 50 in a direction to close the door opening. A force F4 (see FIG. 6) toward the rear end side of the dent reinforcement 60 accordingly acts along the length direction of the dent reinforcement 60 when closing the door opening of the vehicle body with the side door 50. Moreover, when closing the door opening of the vehicle body with the side door 50, a load (reaction force) F5 (see FIG. 6) from the vehicle body toward the vehicle width direction outer side acts on the door inner panel 54. The (joined-to wall 54A of the) door inner panel 54 accordingly attempts to undergo displacement toward the vehicle width direction outer side (the arrow D direction side in FIG. 6).

In the comparative example configured as described above, the spot weld 68 is disposed offset to one side of the angled wall 62 in the direction normal to the plane of the angled wall 62 (the arrow C direction side in FIG. 6). A counterclockwise moment M2 (see the arrow M2 illustrated by an intermittent line in FIG. 6) about the spot weld 68 in plan view is therefore generated in the dent reinforcement 60 by the force F4 when closing the door opening of the vehicle body with the side door 50. The dent reinforcement 60 accordingly attempts to undergo displacement toward the vehicle width direction inner side with respect to the spot weld 68 (see the arrow E illustrated by an intermittent line in FIG. 6). Accordingly, when closing the door opening with the side door 50, the direction in which the joined-to wall 54A of the door inner panel 54 attempts to undergo displacement (the arrow D direction in FIG. 6) and the direction in which the dent reinforcement 60 attempts to undergo displacement with respect to the spot weld 68 (the arrow E direction in FIG. 6) are opposite directions to each other, such that there is a possibility of deformation occurring at the boundary portion of the joining wall 64 with the angled wall 62. There are accordingly concerns of a reduction in the opening and closing durability of the side door 50. However, if, for example, the plate thickness of the dent reinforcement 60 were to be made thicker in order to increase the opening and closing durability of the side door 50, the issue of an increase in the weight of the side door 50 would arise.

In the second exemplary embodiment, the bent portion 66 is formed at the rear end portion of the dent reinforcement 60, and the joining wall 64 and the angled wall 62 of the dent reinforcement 60 are coupled together through the bent portion 66. Moreover, the joining wall 64 and the joined-to wall 54A are joined together in the area A2, this being a region between a portion where the reference line CL3 intersects and a portion where the reference line CL4 intersects in the mating face 70 between the joining wall 64 and the joined-to wall 54A. In other words, the spot weld 68 is set in the area A2 of the joining wall 64. The spot weld 68 is accordingly disposed such that it is not offset in a direction normal to the plane of the angled wall 62 with respect to the angled wall 62 in plan view cross-section.

The moment M2 about the spot weld 68 is accordingly suppressed from being generated when closing the door opening with the side door 50. Since the moment M2 is suppressed from being generated in the dent reinforcement 60, the dent reinforcement 60 follows the displacement of the door inner panel 54 toward the vehicle width direction outer side when closing the door opening with the side door 50, and the dent reinforcement 60 attempts to undergo displacement toward the vehicle width direction outer side with respect to the spot weld 68. The direction in which the joined-to wall 54A of the door inner panel 54 attempts to undergo displacement, and the direction in which the dent reinforcement 60 attempts to undergo displacement with respect to the spot weld 68 when closing the door opening with the side door 50 is accordingly the same direction (the arrow D direction in FIG. 6). Deformation of the boundary portion of the joining wall 64 with the bent portion 66 can accordingly be suppressed as a result. This thereby enables an increase in the opening and closing durability of the side door 50, without increasing the plate thickness of the dent reinforcement 60.

In the second exemplary embodiment, the bent portion 66 is curved in a substantially circular arc shape as viewed along the plate thickness direction of the joining wall 64. This thereby enables the lengths of a bend ridge line between the angled wall 62 and the bent portion 66, and a bend ridge line between the bent portion 66 and the joining wall 64, to be set longer than in cases in which the bent portion 66 is formed in a straight line. Stress acting in the bent portion 66 (more specifically, at the locations of the bend ridge lines) when closing the side door 50 can accordingly be lessened. This thereby enables a further increase in the opening and closing durability of the side door 50.

Note that in the first exemplary embodiment, the bent portion 40 is formed in a straight line along the vehicle width direction; however, the bent portion 40 may be curved in a circular arc shape, similarly to in the second exemplary embodiment.

In the first exemplary embodiment, the angle θ1 formed between the joining wall 32 and the bent portion 40 is set as an obtuse angle, and in the second exemplary embodiment, the angle θ3 formed between the joining wall 64 and the angled wall 62 is set as an obtuse angle; however, the angles of the angles θ1, θ3 may be freely set. For example, the angles θ1, θ3 may be set as right angles. Namely, it is sufficient that the angle θ1 is set smaller than the angle θ2, and that the angle θ3 is set smaller than the angle θ4.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A vehicle panel structure comprising:
a panel member provided in a vehicle, the panel member including a joined-to wall;
a joining member including an angled wall, a joining wall, and a bent portion connecting the angled wall to the joining wall, the angled wall being disposed on a lower side of the joined-to wall of the panel member, the angled wall being angled with respect to the joined-to wall, and the joining wall facing the lower side of the joined-to wall; and
a spot weld provided at a join portion of the joining wall, where the joining wall is joined to the joined-to wall, the spot weld being provided at a portion of the join portion intersecting an extension line extending substantially in a same direction as the angled wall from a connection point between the angled wall and the bent portion.

2. The vehicle panel structure of claim 1, wherein the bent portion is formed in a circular arc shape protruding toward a side of the angled wall as viewed along a thickness direction of the joining wall.

3. The vehicle panel structure of claim 1, wherein:
the panel member is a dent reinforcement panel reinforcing a hood outer panel of a vehicle hood; and
the joining member is a striker reinforcement provided with a striker.

4. The vehicle panel structure of claim 1, wherein:
the panel member is a door inner panel of a vehicle door; and
the joining member is a dent reinforcement disposed on a vehicle width direction outer side of the door inner panel.

5. A vehicle panel structure comprising:
a panel provided in a vehicle, the panel including a joined-to wall; and
a joining member including an angled wall, a joining wall, and a bent portion connecting the angled wall to the joining wall, wherein
the angled wall is disposed on a lower side of the joined-to wall,
the angled wall being angled with respect to the joined-to wall,
the joining wall is disposed to face the lower side of the joined-to wall,
an angle $\theta 1$ formed between the joining wall and the bent portion is obtuse,
an angle $\theta 2$ formed between the joining wall and an extension line extending substantially in a same direction as the angled wall from a connection point between the angled wall and the bent portion is obtuse and larger than the angle $\theta 1$, and
the joined wall is joined to the join-to wall at an intersection of the extension line and the joining wall.

* * * * *